United States Patent [19]

Orita et al.

[11] Patent Number: 4,771,132
[45] Date of Patent: Sep. 13, 1988

[54] CUPROPHTHALOCYANINE TYPE COMPOUNDS

[75] Inventors: Ryuzo Orita, Saitama; Masayoshi Ojima; Shigeo Yamamura, both of Yono, all of Japan

[73] Assignee: Nippon Kayaku Kabushiki Kaisha, Tokyo, Japan

[21] Appl. No.: 865,980

[22] Filed: May 22, 1986

[30] Foreign Application Priority Data

May 30, 1985 [JP] Japan ................................ 60-115392

[51] Int. Cl.[4] ............................................. C09B 47/04
[52] U.S. Cl. .................................................. 540/126
[58] Field of Search ......................................... 540/126

[56] References Cited

U.S. PATENT DOCUMENTS

| | | | |
|---|---|---|---|
| 3,082,207 | 3/1963 | Koller | 540/126 |
| 3,519,614 | 7/1970 | Ponzini | 8/543 X |
| 3,522,232 | 7/1970 | Ponzini et al. | 8/543 X |
| 3,527,747 | 9/1970 | Mangini et al. | 540/126 X |
| 4,330,469 | 5/1982 | Gati et al. | 540/126 |
| 4,453,945 | 6/1984 | Miyamoto et al. | 8/543 |

Primary Examiner—Richard L. Raymond
Attorney, Agent, or Firm—Banner, Birch, McKie & Beckett

[57] ABSTRACT

A cuprophthalocyanine type compound represented by formula [1] in the form of free acid

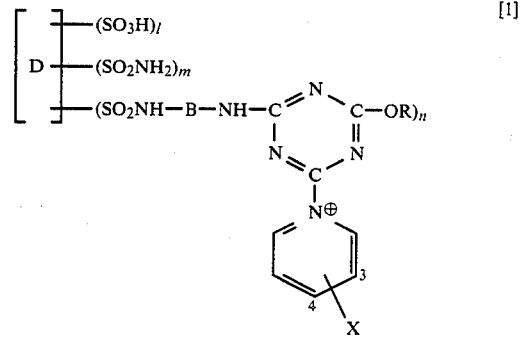

(wherein D is a cuprophthalocyanine radical; B is an alkylene group of 2 to 4 carbon atoms or a phenylene group which may have one or two carboxyl group(s) or sulfonic acid group(s) as a substituent(s); R is a lower alkyl group or a lower alkoxy-lower alkyl group; X is a carboxyl group or a carbamoyl group and combines with the 3- or 4-position of the pyridine ring; $l$ is 1, 2 or 3; m is 0, 1 or 2; n is 1 or 2; and the sum of $l$, m and n is 2, 3 or 4) as well as a method for dyeing cellulosic fiber materials using the said compounds.

4 Claims, No Drawings

CUPROPHTHALOCYANINE TYPE COMPOUNDS

BACKGROUND OF THE INVENTION

1. FIELD OF THE INVENTION

This invention relates to cuprophthalocyanine type compounds and a method for dyeing cellulosic fiber materials using the said compounds.

2. DESCRIPTION OF THE PRIOR ART

In dyeing cellulosic fibers, reactive dyes are currently in use in a large amount because they are excellent in brightness and various fastnesses when compared with another kind of dyes.

Dyeing cellulosic fibers by a reactive dye is conducted by preparing a dye-bath containing a reactive dye having a reactive group such as dichlorotriazinyl, monochlorotriazinyl, fluorochloropyrimidinyl, dichloroquinoxalinyl, methylsulfonylpyrimidinyl, vinylsulfonyl, sulfatoethylsulfonyl, adjusting the pH of the dye-bath to 10 or above with an acid binding agent or a substance capable of releasing an acid binding agent by action of a heat or the like, such as sodium carbonate, potassium carbonate, sodium hydroxide, potassium hydroxide, sodium metasilicate, sodium phosphate, potassium phosphate, potassium pyrophosphate, sodium pyrophosphate, sodium bicarbonate and sodium trichloroacetate, and treating a cellulosic fiber in a dye-bath at a temperature of 100° C. or below in the presence of a neutral electrolyte such as sodium chloride or sodium sulfate. As fiber materials for clothing, blended fiber materials consisting of a cellulosic fiber and other fiber(s) are in wide use. In particular, blended fibers between a polyester fiber and cotton (these blended fibers are hereinafter referred to as T/C blends) are in use in a large amount for their excellency in suitability as clothing and economy. T/C blends are ordinarily dyed according to the following methods using a reactive dye and a disperse dye.

(1) One bath two step method

Firstly, the polyester fiber portion of a T/C blend is dyed with a disperse dye according to a carrier dyeing method, a high temperature dyeing method or the like. Subsequently, the cotton portion is dyed in the same bath with a reactive dye. Alternatively, dyeing is conducted in a reverse order.

(2) Two bath method

Firstly, the polyester fiber portion of a T/C blend is dyed in the same manner as mentioned in above (1). Then, the cotton portion is dyed in a separate dye-bath. Alternatively, dyeing is conducted in a reverse order.

With a view to shortening of dyeing time, rationalization of dyeing process and energy saving, attempts have been made to conduct dyeing of T/C blends according to one bath one step method wherein both the polyester fiber portion and the cotton portion of a T/C blend are dyed in one dye-bath and yet in one dyeing procedure. However, dyeing of T/C blends with a reactive dye and a disperse dye in one bath one step method according to a high temperature method or the like has various obstacles to be overcome. For example, an acid binding agent or a substance capable of releasing an acid binding agent which is required in dyeing cotton by a reactive dye agglomerates or decomposes a disperse dye coexisting in a dye-bath. Meanwhile, a reactive dye is hydrolyzed by action of an acid binding agent or the like in an aqueous medium of high temperature (e.g. 130° C.) required for dyeing the polyester fiber portion, as a result of such hydrolysis, fixation of the reactive dye to cotton may become impossible. Hence, development of a reactive dye which enables dyeing T/C blends according to one bath one step method has been strongly desired.

SUMMARY OF THE INVENTION

The present inventors conducted an extensive study in order to develop a reactive dye (particularly, a reactive blue dye) which enables one bath one step dyeing of T/C blends. As a result, the present invention has been accomplished.

The present invention provides a cuprophthalocyanine type compound represented by formula [1] in the form of free acid

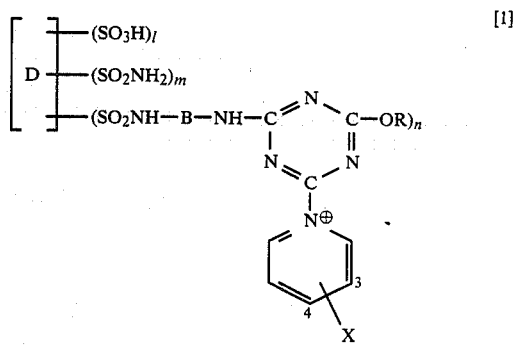

(wherein D is a cuprophthalocyanine radical; B is an alkylene group of 2 to 4 carbon atoms or a phenylene group which may have one or two carboxyl group(s) or sulfonic acid group(s) as a substituent(s); R is a lower alkyl group or a lower alkoxy-lower alkyl group; X is a carboxyl group or a carbamoyl group and combines with the 3- or 4-position of the pyridine ring; l is 1, 2 or 3; m is 0, 1 or 2; n is 1 or 2; and the sum of l, m and n is 2, 3 or 4) as well as a method for dyeing cellulosic fiber materials which comprises dyeing the fibers by the said compound.

DETAILED DESCRIPTION OF THE INVENTION

The compound of formula [1] according to the present invention is suitable for dyeing cellulosic fibers according to one bath one step method in the presence of an acid binding agent. Further, quite surprisingly, the compound can uniformly dye T/C blends at 95° to 150° C. in the presence of a disperse dye using no acid binding agent and accordingly is very suitable for dyeing T/C blends according to one bath one step method. In this case, if necessary, a buffer agent capable of keeping the pH of the dye-bath at 4 to 10, particularly 5 to 9 can be added to the dye-bath, whereby a higher effect is obtained. The compound of the present invention is applicable not only to T/C blends but also to fiber materials such as those consisting only of a cellulosic fiber.

The compound represented by formula [1] can dye cellulosic fibers in a bright, greenish blue color shade. The dyed products are very excellent in wet fastness, chlorine-containing water resistance, light fastness and perspiration-light fastness.

The compound of the present invention is also characterized in that the compound represented by formula [1] has high color value and high build-up property.

The compound of the present invention exhibits the most striking effect when used for dyeing cellulosic fibers (e.g. cotton, rayon, hemp) and T/C blends. Further, the compound can provide uniformly dyed products when used for dyeing blends between a polyester fiber and rayon or between cotton or rayon and a triacetate fiber, a polyacrylonitrile fiber, a modified polyacrylonitrile fiber, a a polyamide fiber, wool, silk or the like, in combination with a disperse dye, a basic dye, a cationic dye, an acid dye, a metal-containing acid dye or the like.

The compound represented by formula [1] can be synthesized, for example, as follows.

Cyanuric chloride and an alcohol represented by formula [2]

   R—OH   [2]

(wherein R has the same definition as given previously) may be reacted to obtain a compound represented by formula [3] in the presence of sodium hydrogencarbonate, sodium carbonate or potassium carbonate at temperatures of 0° to 10° C. for 0.5 to 2.0 hours (First condensation).

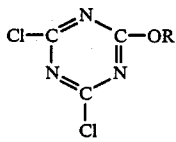 [3]

This compound may be reacted with a compound represented by formula [4]

H₂N—B—NH₂   [4]

(wherein B has the same definition as given previously) to obtain a compound represented by formula [5], on keeping the pH at 4 to 8 by adding, for example, sodium carbonate, potassium carbonate, sodium hydroxide or potassium hydroxide, at temperatures of 30° to 50° C. (Second condensation),

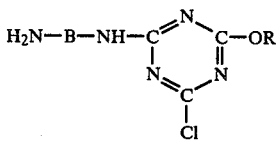 [5]

(wherein B and R have the same difinitions as given previously).

Separately, cuprophthalocyanine is chlorosulfonated with chlorosulfonic acid to obtain cuprophthalocyanine di- or tri- or tetrasulfonylchloride. This chloride may be reacted with a compound of formula [5] obtained previously in a molar ratio (cuprophthalocyanine to formula [5] compound) of 1 to 2 in the presence of absence of ammonia or an ammonia-releasing substance such as ammonium chloride and ammonium sulfate, to obtain a compound represented by formula [6] at pH 7 to 12 and temperatures of 5° to 30° C. When ammonia or an ammonia-releasing substance is not used, the reaction may be carried out in the presence of sodium carbonate, potassium carbonate or the like, at pH 7 to 12,

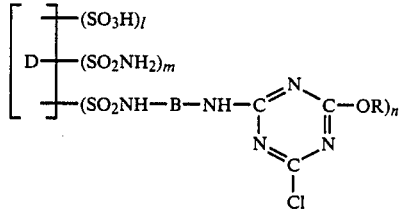 [6]

(wherein D, B, R, l, m and n have the same definitions as given previously).

This compound may be reacted with a pyridine derivative represented by formula [7] at temperatures of 50° to 80° C.

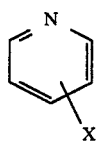 [7]

(wherein X has the same definition as given previously) to obtain a compound represented by formula [1] for 5 to 9 hours (Third condensation).

A compound represented by formula [1] can be obtained in the form of free acid by acidifying the reaction mixture obtained after the third condensation with acids. And a compound represented by formula [1] can be obained in the K-salt and Na-salt of the compound by salting the reaction mixture obtained after the third condensation with potassium chloride and sodium chloride, respectively.

As the alcohol represented by formula [2], there can be mentioned, for example, the following alcohols.

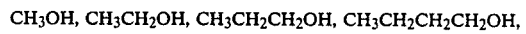

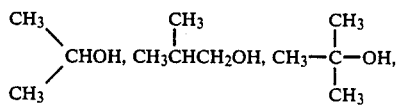

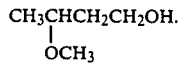

As the diamine represented by formula [4], there can be mentioned, for example, the following compounds.

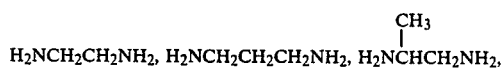

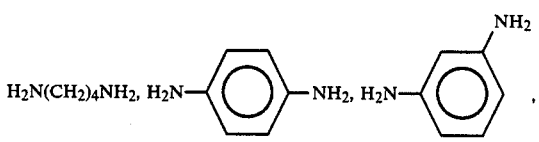

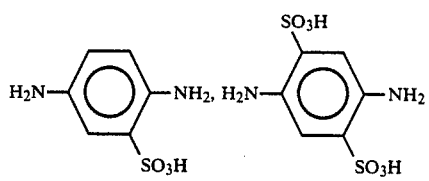

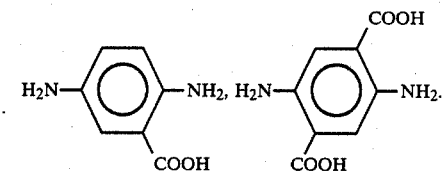

As the pyridine derivatives represented by formula [7], there can be mentioned the following compounds.

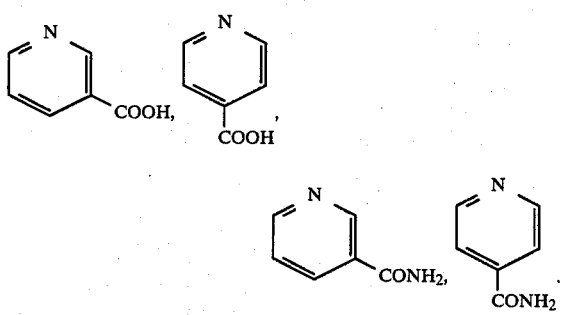

Next, the method for dyeing fiber materials using the compound of formula [1] of the present invention will be explained.

When fiber materials consisting only of a cellulosic fiber are dyed according to a dip dyeing method, a dye-bath is prepared using the compound of the present invention, an inorganic salt (e.g. sodium sulfate, sodium chloride), etc.; a fiber is dipped therein; dyeing is conducted at 50° to 90° C. for 10 to 60 minutes; then, an acid binding agent is added and dyeing is conducted again at the same temperature for 20 to 60 minutes. Various other dip dyeing methods can be employed. For example, dyeing is conducted with an acid binding agent added to a dye-bath at the time of preparing the dye-bath; or, a fiber is treated firstly in a dye-bath consisting only of the compound of the present invention and then in a bath consisting of an acid binding agent and an inorganic salt; or, a dye-bath is prepared using the compound of the present invention, an inorganic salt, etc., a buffer agent is added if necessary, and dyeing is conducted at 90° to 150° C. for 10 to 60 minutes. Besides the dip dyeing method, there can also be used an ordinary padding dyeing method and an ordinary printing method.

When T/C blends are dyed, there is prepared a dye-bath consisting of the compound of the present invention, a disperse dye, if necessary, an inorganic salt, a buffer agent capable of keeping the pH of the bath at 5 to 9, a surfactant, a reduction inhibitor, etc.; a blended fiber is dipped therein; and dyeing is conducted at 95° to 150° C. for 20 to 90 minutes. Dyeing is also possible in this case in the presence of an ordinary acid binding agent. Blended fibers other than T/C blends can also be dyed by appropriately selecting a dye to be used in combination with the compound of the present invention and modifying the above dyeing procedure as necessary.

The compound of the present invention can be used singly or in combination of two or more.

As the acid binding agent, there can be mentioned sodium carbonate, potassium carbonate, sodium hydroxide, potassium hydroxide, sodium metasilicate, sodium phosphate, potassium phosphate, potassium pyrophosphate, sodium pyrophosphate, sodium bicarbonate, sodium trichloroacetate, etc. As the buffer agent, there can be used acetic acid—sodium acetate, potassium primary phosphate-sodium secondary phosphate, sodium primary phosphate—sodium secondary phosphate, maleic acid—borax, etc.

The present invention will be explained in more detail by way of Examples. However, the present invention is not restricted to these Examples. In the Examples, parts are parts by weight.

EXAMPLE 1

7 parts of sodium hydrogencarbonate was added to 50 parts of methanol. This mixture was cooled to 0° C. from outside. Then, 15 parts of cyanuric chloride was added to conduct a reaction for 60 minutes (First condensation). To the reaction mixture was added 100 parts of ice water, and the crystal precipitated was collected by filtration to obtain 2-methoxy-4,6-dichloro-1,3,5-triazine.

This wet crystal was dispersed in 50 parts of ice water. Thereto was added 7.8 parts of ethylenediamine dihydrochloride. The mixture was heated to 40° C. Then, a 20% aqueous sodium carbonate solution was added to the mixture to adjust its pH to about 5.0, and the mixture was subjected to a reaction for 3 hours to obtain a reaction mixture containing 2-methoxy-4-(2-aminoethylamino)-6-chloro-1,3,5-triazine (Second condensation).

Separately, 23.1 parts of cuprophthalocyanine was added to 140 parts of chlorosulfonic acid, and chlorosulfonation was conducted at 140° to 145° C. for 3 hours. The reaction mixture was poured into ice water, and the crystal precipitated was collected by filtration and washed with ice water to obtain a chlorosulfonated cuprophthalocyanine.

This product was dispersed in 150 parts of ice water. Thereto was added the total amount of the previously prepared reaction mixture containing 2-methoxy-4-(2-aminoethylamino)-6-chloro-1,3,5-triazine.

Then, 1 part of ammonium chloride was added, after which a 10% aqueous sodium hydroxide solution was added to adjust the pH of the resulting mixture to 10.5. A reaction was conducted for 1 hour. The reaction mixture was heated to 40° C. and a reaction was conducted for 1 hour while keeping the same pH (10.5).

After the completion of the reaction, 13 parts of nicotinic acid was added and a reaction was conducted at 70° C. for 7 hours (Third condensation). After the completion of the reaction, sodium chloride was added and the crystal precipitated was collected by filtration and dried to obtain 70 parts of a compound represented by the following formula. The compound showed a $\lambda_{max}$ of 625 m$\mu$ in a 20% pyridine solution.

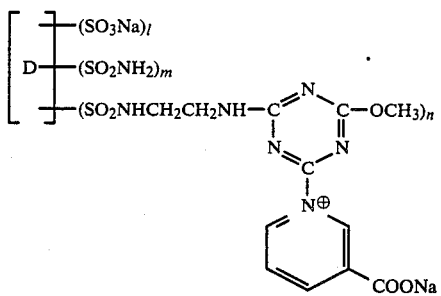

[8]

(wherein D is a cuprophthalocyanine radical and the sum of l, m and n is 4).

65 parts of a compound represented by the following formula

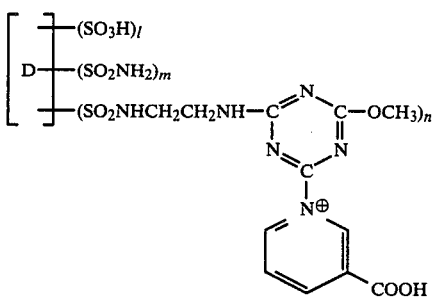

[9]

(wherein D is a cuprophthalocyanine radical and the sum of l, m and n is 4) was obtained by acidifying the third condensation reaction mixture obtained by the same method as mentioned previously with sulphuric acid. The compound showed a $\lambda_{max}$ of 625 m$\mu$ in a 20% pyridine solution.

And 75 parts of a compound represented by the following formula

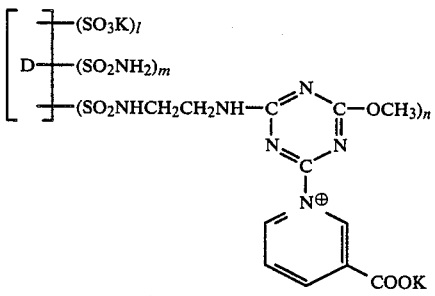

[10]

(wherein D is a cuprophthalocyanine radical and the sum of l, m and n is 4) was obtained by salting the third condensation reaction mixture obtained by the same method as mentioned previously with potassium chloride. The compound showed a $\lambda_{max}$ of 625 m$\mu$ in a 20% pyridine solution.

EXAMPLE 2

The same procedure as in Example 1 was repeated except that the reaction of the chlorosulfonated cuprophthalocyanine and 2-methoxy-4-(2-aminoethylamino)-6-chloro-1,3,5-triazine was conducted, under adjusting the pH of the reaction mixture to 10 with sodium carbonate, without adding ammonium chloride, whereby 70 parts of the following compound were obtained. The compound showed a $\lambda_{max}$ of 615 m$\mu$ in a 20% pyridine solution

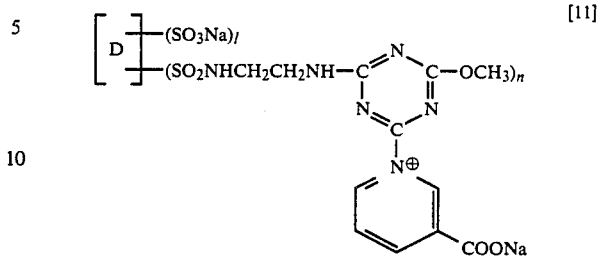

[11]

(wherein D is a cuprophthalocyanine radical and the sum of l and n is 4). A compound represented by formula [11] was obtained in the form of free acid [—(-SO$_3$H)$_l$, —COOH] by the same procedure with that of Example 2.

EXAMPLE 3

There was prepared a dye-bath consisting of 2 parts of the compound [8] obtained in Example 1, 60 parts of Glauber's salt, 2 parts of Na$_2$HPO$_4$.12H$_2$O, 0.5 part of KH$_2$PO$_4$, 1 part of sodium metanitrobenzenesulfonate and 934.5 parts of water. The dye-bath showed a pH 7. 50 parts of a bleached, non-mercerized cotton knitted fabric was placed in the dye-bath. The dye-bath temperature was increased to 130° C. in 30 minutes with stirring, and dyeing of the knitted fabric was conducted for 30 minutes at that temperature. The dye-bath after dyeing showed the same pH as before dyeing, namely, 7. The dyed fabric was water-washed, subjected to soaping at 100° C. for 10 minutes with 1,000 parts of an aqueous solution containing 2 parts of an anionic surfactant, water-washed again and dried to obtain a dyed fabric in a bright, greeenish blue color shade.

The dyed fabric was excellent in wet fastness, chlorine-containing water resistance, light fastness and perspiration-light fastness.

EXAMPLE 4

50 parts of a T/C blend (cloth) consisting of equal parts of a polyester fiber and cotton was placed in a dye-bath of total 1,000 parts, containing 1 part of the compound [8] obtained in Example 1, 1 part of Kayalon Polyester Turquoise Blue GL-S (a disperse dye manufactured by Nippon Kayaku Co., Ltd.), 80 parts of Glauber's salt and 2 parts of a formalin condensate of naphthalenesulfonic acid and adjusted to a pH 7.0 with a buffer agent consisting of maleic acid and borax. The dye-bath temperature was increased to 130° C. in 20 minutes and dyeing was conducted at that temperature for 60 minutes. After water washing, the dyed cloth was subjected to soaping at 100° C. for 20 minutes in 1,000 parts of water containing 2 parts of an anionic surfactant and 2 parts of soda ash, followed by water washing and drying, to obtain a dyed cloth whose polyester fiber and cotton portions both were uniformly dyed in a bright, greenish blue color shade.

EXAMPLE 5

There was prepared a dye-bath of total 1,000 parts, containing 1 part of the compound [11] obtained in Example 2, 1 part of Kayalon Polyester Turquoise Blue GL-S (a disperse dye manufactured by Nippon Kayaku Co., Ltd.), 2 parts of a formalin condensate of naphthalenesulfonic acid and 5 parts of Tetorocin K (a carrier manufactured by Yamakawa Yakuhin Co., Ltd.) and adjusted to a pH 7 with the same buffer agents ($Na_2HPO_4$ and $KH_2PO_4$) as used in Example 3. Therein were placed 50 parts of a T/C (50/50) knitted fabric. The dye-bath temperature was increased to 100° C. and dyeing was conducted at that temperature for 60 minutes. Then, washing was conducted in the same manner as in Example 3 to obtain a dyed fabric whose polyester fiber and cotton portions both were uniformly dyed in a bright, greenish blue color shade.

EXAMPLE 6

A dye-bath was prepared using 2 parts of the compound [8] obtained in Example 1, 80 parts of Glauber's salt and 1,000 parts of water. 50 parts of a cotton knitted fabric was dipped in the dye-bath and dyeing was conducted at 80° C. for 30 minutes. 20 parts of sodium carbonate were added and dyeing was conducted again at the same temperature for 60 minutes. Washing was conducted in the same manner as in Example 3 to obtain a dyed fabric having a bright, greenish blue color shade.

EXAMPLES 7 TO 22

Compounds represented by the following formula were synthesized according to a procedure similar to that of Example 1 or 2. Dyeings of cotton knitted fabric were conducted using the compounds in a procedure similar to that of Example 3.

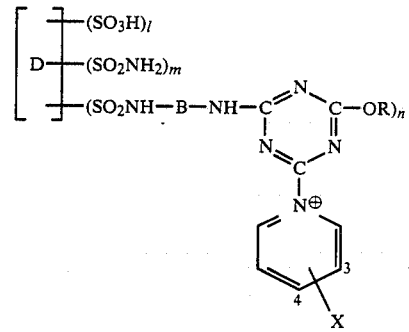

(wherein D is a cuprophthalocyanine radical; and B, R, X, l, m and n have the same definitions as given previously).

Shown in the following table are the actual position of pyridine ring to which the X is combined, the actual l, m and n values of each compound, the actual $\lambda_{max}$ of each compound in a 20% pyridine solution and the actual color shade of each dyed cotton knitted fabric obtained. Each compound in these Examples is actually a mixture of compounds having various l, m and n values within the definitions given previously; however, the l, m and n values shown in the table are those of each main component.

In the formulas, the carboxyl groups and the sulfonic acid groups are represented in the forms of free acids.

TABLE

| Example | —B— | R— | —X | Position of pyridine to which X is combined | l | m | n | $\lambda_{max}$ (mμ) | Color shade of dyed cloth |
|---|---|---|---|---|---|---|---|---|---|
| 7 | —$CH_2CH_2$— | $C_2H_5$— | —COOH | 4 | 2 | 1 | 1 | 627 | Greenish blue |
| 8 | —$CH_2CH_2CH_2$— | $C_3H_7$— | —$CONH_2$ | 3 | 3 | 0 | 1 | 618 | Same as above |
| 9 | —CH($CH_3$)$CH_2$— | $CH_3OC_2H_4$— | —$CONH_2$ | 4 | 2 | 0 | 1 | 614 | Same as above |
| 10 | —$(CH_2)_4$— | $(CH_3)_2CH$— | —COOH | 3 | 2 | 1 | 1 | 625 | Same as above |
| 11 | —$C_6H_4$— (phenylene) | $CH_3$—$(CH_2)_3$— | —COOH | 4 | 3 | 0 | 1 | 632 | Same as above |
| 12 | —$C_6H_3(SO_3H)$— | $C_2H_5OC_2H_4$— | —$CONH_2$ | 3 | 2 | 1 | 1 | 635 | Same as above |
| 13 | —$C_6H_4$— | $(CH_3)_3C$—$CH_2$— | —COOH | 3 | 3 | 0 | 1 | 632 | Greenish blue |

TABLE-continued

| Example | —B— | R— | —X | Position of pyridine to which X is combined | l | m | n | $\lambda_{max}$ (m$\mu$) | Color shade of dyed cloth |
|---|---|---|---|---|---|---|---|---|---|
| 14 | -C₆H₄-SO₃H (with additional substituent) | $(CH_3)_3C-$ | —CONH₂ | 4 | 3 | 0 | 1 | 633 | Same as above |
| 15 | -C₆H₃(SO₃H)₂ | $C_4H_9OC_2H_4-$ | —COOH | 3 | 1 | 0 | 1 | 620 | Same as above |
| 16 | -C₆H₄-COOH (substituted) | $CH_3-$ | —COOH | 3 | 3 | 0 | 1 | 635 | Same as above |
| 17 | -C₆H₃(COOH)₂ | $CH_3OC_2H_4-$ | —COOH | 4 | 2 | 1 | 1 | 637 | Greenish blue |
| 18 | —CH₂CH₂— | $CH_3CH(OCH_3)CH_2CH_2-$ | —COOH | 3 | 3 | 0 | 1 | 620 | Same as above |
| 19 | -C₆H₄- | $CH_3-$ | —COOH | 3 | 2 | 0 | 1 | 632 | Same as above |
| 20 | -C₆H₄- | $CH_3-$ | —CONH₂ | 3 | 2 | 1 | 1 | 632 | Same as above |
| 21 | -C₆H₄- | $CH_3-$ | —COOH | 3 | 2 | 1 | 1 | 632 | Same as above |
| 22 | -C₆H₄- | $CH_3-$ | —CONH₂ | 4 | 3 | 0 | 1 | 632 | Same as above |

The present invention has enabled uniform dyeing of T/C blends in one bath one step method in the co-existence of a disperse dye. The compound has a good deal of economical effect in view of its shortening of dyeing time, rationalization of dyeing process and energy saving.

What is claimed is:

1. A cuprophthalocyanine type compound represented by formula [1] in the form of free acid

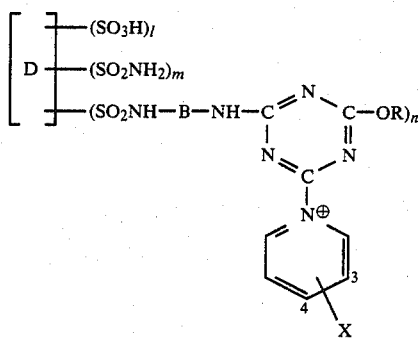

(wherein D is a cuprophthalocyanine radical; B is an alkylene group of 2 to 4 carbon atoms; R is a lower alkyl group; X is a carboxyl group or a carbamoyl group attached at the 3- or 4-position of the pyridine ring; $l$ is 1, 2 or 3; m is 0, 1 or 2; n is 1 or 2; and the sum of $l$, m and n is 2, 3 or 4).

2. A compound according to claim 1, wherein R in formula [1] is

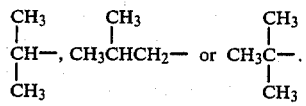

3. A compound, according to claim 1 which, in the form of free acid, is represented by the following formula

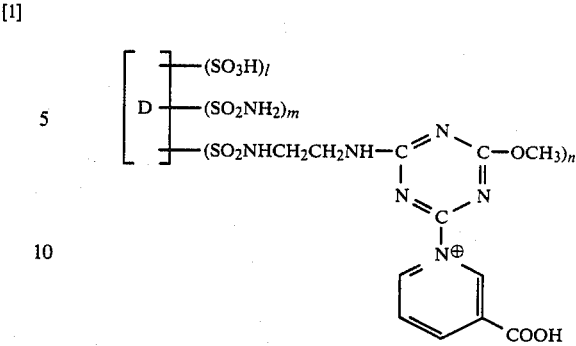

(wherein D is a cuprophthalocyanine radical and the sum of $l$, m and n is 4).

4. A compound, according to claim 1, which, in the form of free acid, is represented by the following formula

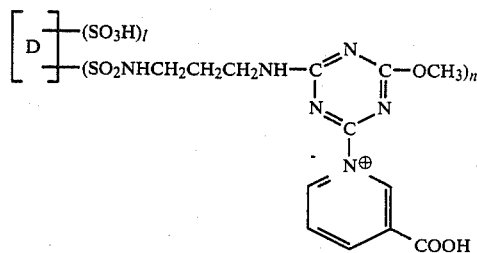

(wherein D is a cuprophthalocyanine radical and the sum of $l$ and n is 4).

* * * * *